US006820053B1

(12) United States Patent
Ruwisch

(10) Patent No.: US 6,820,053 B1
(45) Date of Patent: Nov. 16, 2004

(54) METHOD AND APPARATUS FOR SUPPRESSING AUDIBLE NOISE IN SPEECH TRANSMISSION

(75) Inventor: Dietmar Ruwisch, Deuelstr. 15a, 12459 Berlin (DE)

(73) Assignee: Dietmar Ruwisch, Berlin (DE)

( * ) Notice: Subject to any disclaimer, the term of this patent is extended or adjusted under 35 U.S.C. 154(b) by 394 days.

(21) Appl. No.: 09/680,981

(22) Filed: Oct. 6, 2000

(30) Foreign Application Priority Data

Oct. 6, 1999 (DE) ........................................ 199 48 308

(51) Int. Cl.[7] ................................................ G10L 15/16

(52) U.S. Cl. ....................... 704/232; 704/226; 704/202; 706/22; 706/25; 706/31; 381/94.3

(58) Field of Search ................................ 704/232, 226, 704/202; 706/22, 25, 31; 381/94.3

(56) References Cited

U.S. PATENT DOCUMENTS

| | | | | |
|---|---|---|---|---|
| 3,610,831 A | * 10/1971 | Moshier | ..................... | 704/232 |
| 5,335,312 A | * 8/1994 | Mekata et al. | .............. | 704/202 |
| 5,377,302 A | * 12/1994 | Tsiang | ........................ | 704/235 |
| 5,550,924 A | * 8/1996 | Helf et al. | ................. | 381/94.3 |
| 5,581,662 A | * 12/1996 | Furuta et al. | ................. | 706/25 |
| 5,649,065 A | * 7/1997 | Lo et al. | ........................ | 706/22 |
| 5,822,742 A | * 10/1998 | Alkon et al. | .................. | 706/31 |
| 5,960,391 A | * 9/1999 | Tateishi et al. | ............. | 704/232 |

* cited by examiner

*Primary Examiner*—Richemond Dorvil
*Assistant Examiner*—Qi Han
(74) *Attorney, Agent, or Firm*—Birch, Stewart, Kolasch & Birch, LLP

(57) ABSTRACT

Method of suppressing audible noise in speech transmission by means of a multi-layer self-organizing fed-back neural network comprising a minima detection layer, a reaction layer, a diffusion layer and an integration layer, said layers defining a filter function F(f,T) for noise filtering.

13 Claims, 5 Drawing Sheets

METHOD AND APPARATUS FOR SUPPRESSING AUDIBLE NOISE IN SPEECH TRANSMISSION

BACKGROUND OF THE INVENTION

The invention relates to a method and apparatus for suppressing audible noise in speech transmission by means of a multi-layer self-organizing fed-back neural network.

DESCRIPTION OF RELATED ART

In telecommunications and in speech recording in portable recording equipment, a problem is that the intelligibility of the transmitted or recorded speech may be impaired greatly by audible noise. This problem is especially evident where car drivers telephone inside their vehicle with the aid of hands-free equipment. In order to suppress audible noise, it is common practice to insert filters into the signal path. In this respect, the utility of classical bandpass filters is limited as the audible noise is most likely to appear with in the same frequency ranges as the speech signal itself. For this reason, adaptive filters are needed which automatically adapt to existing noise and to the properties of the speech signal to be transmitted. A number of different concepts is known and used to this end.

A device derived from optimum matched filter theory is the Wiener-Kolmogorov Filter (S. V. Vaseghi, Advanced Signal Processing and Digital Noise Reduction", John Wiley and Teubner-Verlag, 1996). This method is based on minimizing the mean square error between the actual and the expected speech signals. This filtering concept calls for a considerable amount of computation. Besides, a theoretical requirement of this and most other prior methods is that the audible noise signal be stationary.

The Kalman filter is based on a similar filtering principle (E. Wan and A. Nelson, Removal of noise from speech using the Dual Extended Kalman Filter algorithm, Proceedings of the IEEE International Conference on Acoustics and Signal Processing (ICASSP'98), Seattle 1998). A shortcoming of this filtering principle is the extended training time necessary to determine the filter parameter.

Another filtering concept has been known by H. Hermansky and N. Morgan, RASTA processing of speech, IEEE Transactions on Speech and Audio Processing, Vol. 2, No. 4, p. 587, 1994. This method also calls for a training procedure; besides, different kinds of noise call for different parameter settings.

A method known as LPC requires lengthy computation to derive correlation matrices for the computation of filter coefficients with the aid of a linear prediction process; in this respect, see T. Arai, H. Hermansky, M. Paveland, C. Avendano, Intelligibility of Speech with Filtered Time Trajectories of LPC Cepstrum, The Journal of the Acoustical Society of Maerica, Vol. 100, No. 4, Pt. 2, p. 2756, 1996.

Other prior methods use multi-layer perceptron type neural networks for speech amplification as described in H. Hermansky, E. Wan, C. Avendano, Speech Enhancement Based on Temporal Processing. Proceedings of the IEEE International Conference on Acoustics and Signal Processing (ICASSP'95), Detroit, 1995.

BRIEF SUMMARY OF THE INVENTION

The object of the present invention is to provide a method in which a moderate computational effort is sufficient to identify a speech signal by its time and spectral properties and to remove audible noise from it.

This object is achieved by a filtering function F(f,T) for noise filtering which is defined by a minima detection layer, a reaction layer, a diffusion layer and an integration layer.

A network organized this way recognizes a speech signal by its time and spectral properties and can remove audible noise from it. The computational effort required is low, compared with prior methods. The method features a very short adaptation,time within which the system adapts to the nature of the noise. The signal delay involved in signal processing is very short so that the filter can be used in real-time telecommunications.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
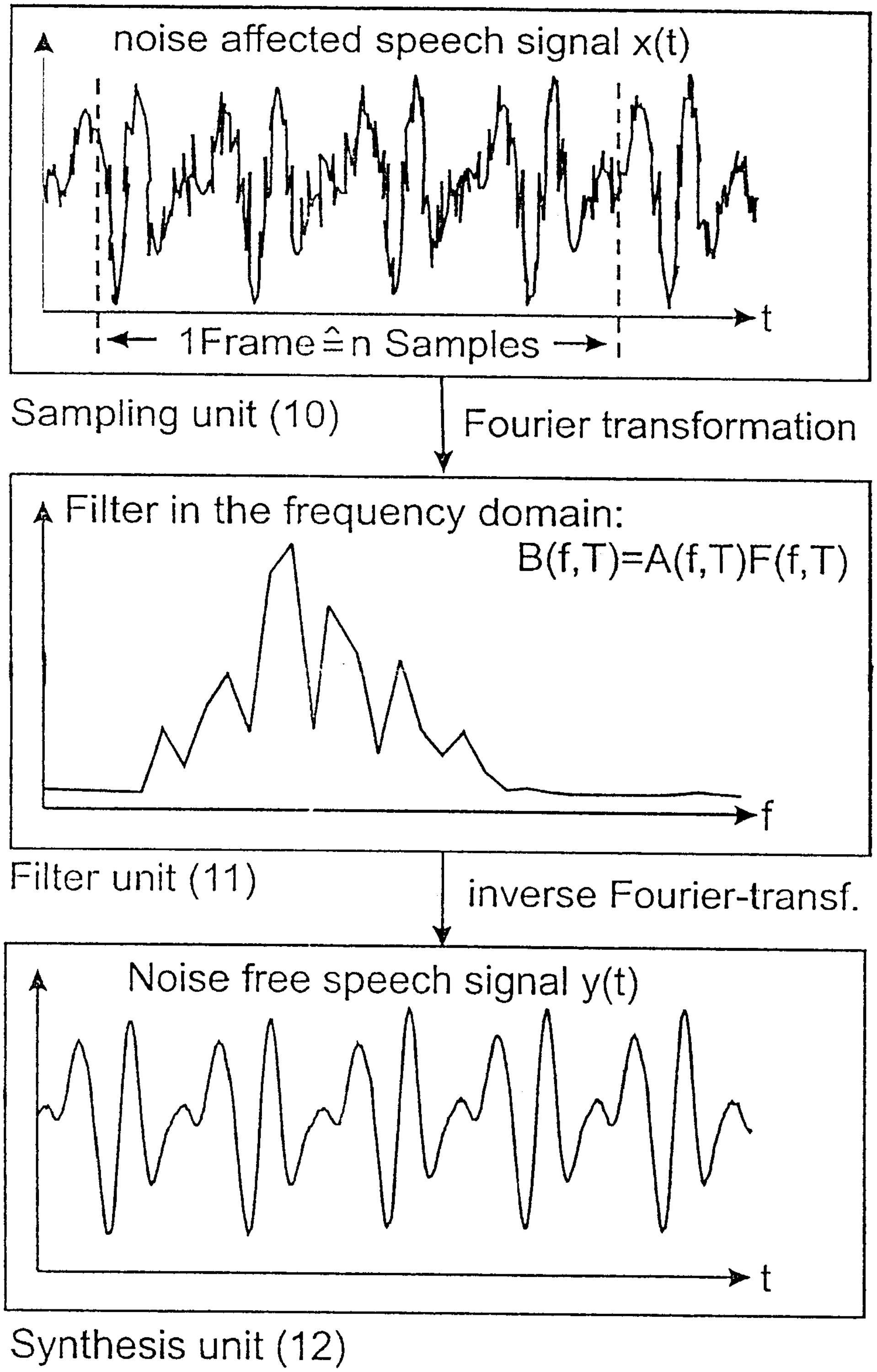
FIG. 1 the inventive speech filtering system in its entirety.

FIG. 1 schematically shows in its entirety an exemplary speech filtering system. This system comprises a sampling unit 10 to sample the noisy speech signal in time t to so derive discrete samples x(t) which are assembled in time T to form frames each consisting of n samples.

Figure 2:
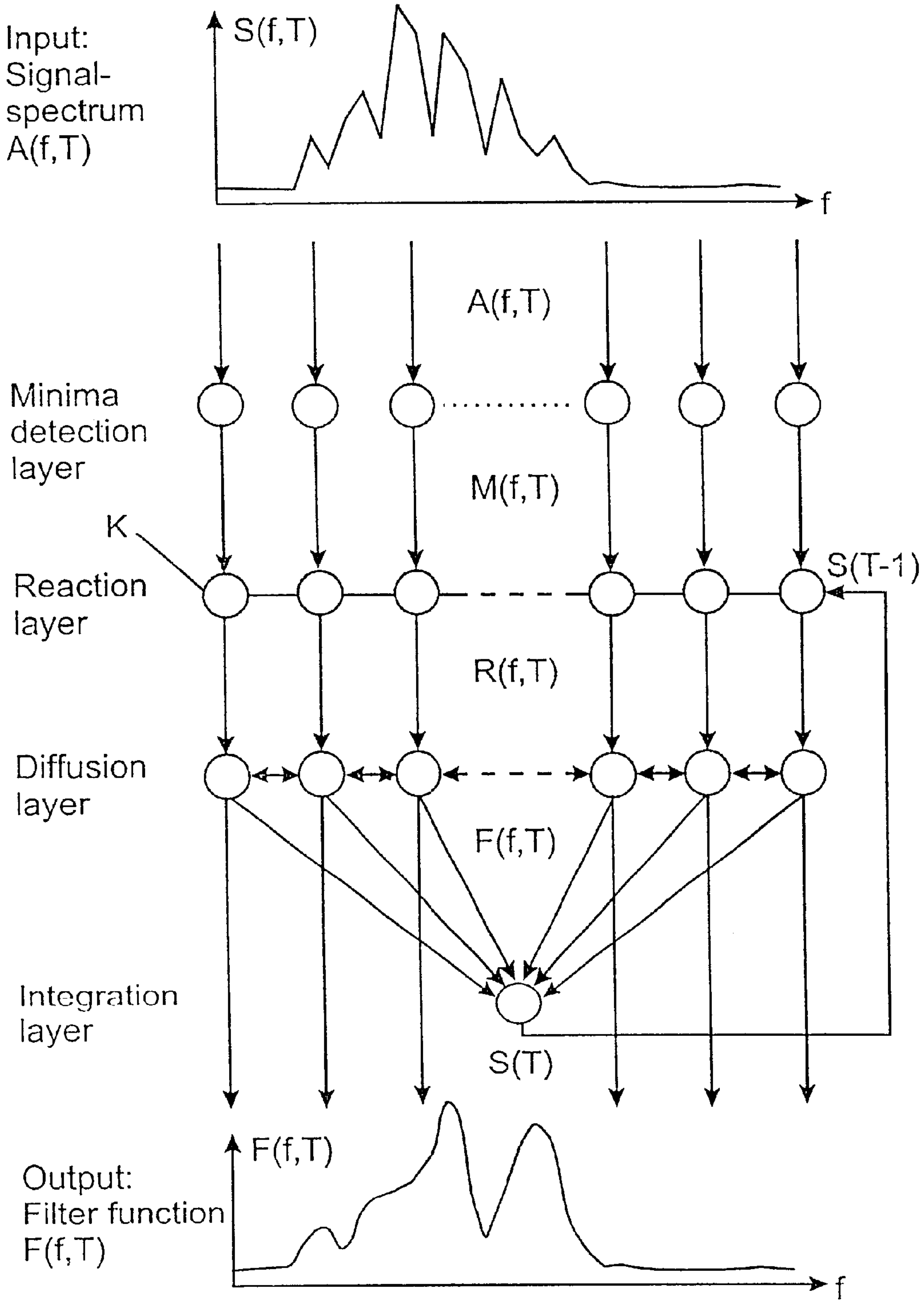
FIG. 2 a neural network comprising a minima detection layer, a reaction layer, a diffusion layer and an integration layer.

The spectrum A(f,T) of each such frame is derived at time T using Fourier transformation and applied to a filtering unit 11 using a neural network of the kind shown in FIG. 2 to compute a filtering function F(f,T) which is multiplied with signal spectrum A(f,T) to generate noise-free spectrum B(f, T). The signal so filtered is then passed on to a synthesis unit 12 which uses an inverse Fourier transformation on filtered spectrum B(f,T) to synthesize the noise-free speech signal y(t).

FIG. 2 shows a neural network comprising a minima detection layer, a reaction layer, a diffusion layer and an integration layer which is an essential part of the invention;

it has input signal spectrum A(f,T) applied thereto to compute filtering function F(f,T). Each mode of the spectrum, which differ in frequency f, corresponds to a single neuron per network layer with the exception of the integration layer. The various layers are explained in greater detail in the following Figures.

Figure 3:
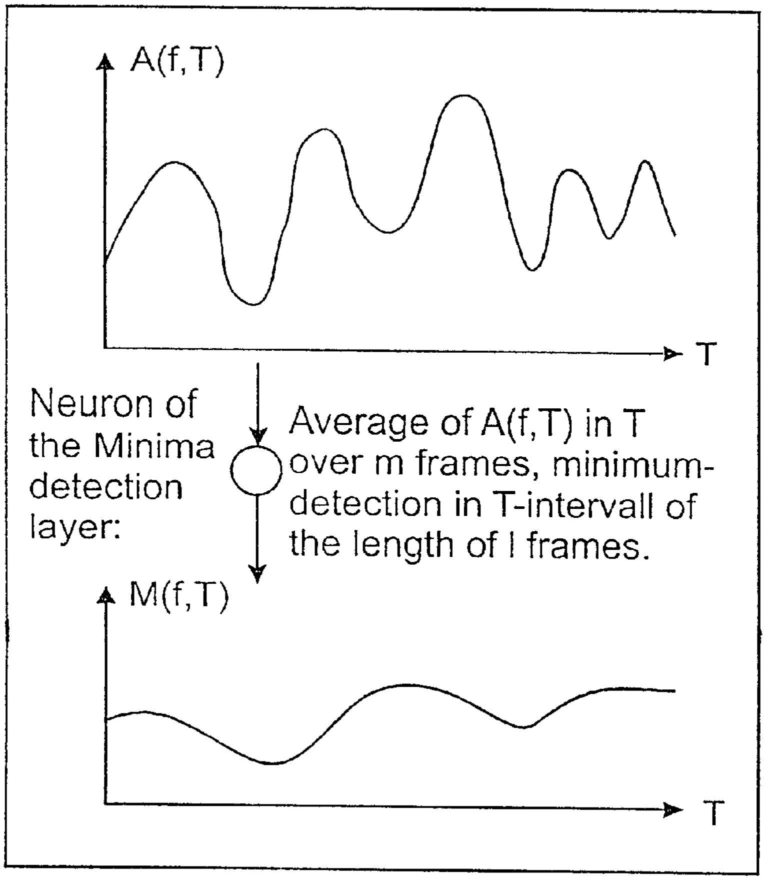
FIG. 3 a neuron of the minima detection layer determining M(F,T)

Thus FIG. 3 shows a neuron of the minima detection layer which determines M(f,T). In the mode of frequency f, the amplitudes A(f,T) are averaged over m frames. M(f,T) is the minimum of those average amplitudes within a time interval, which corresponds to the length of 1 frames.

Figure 4:
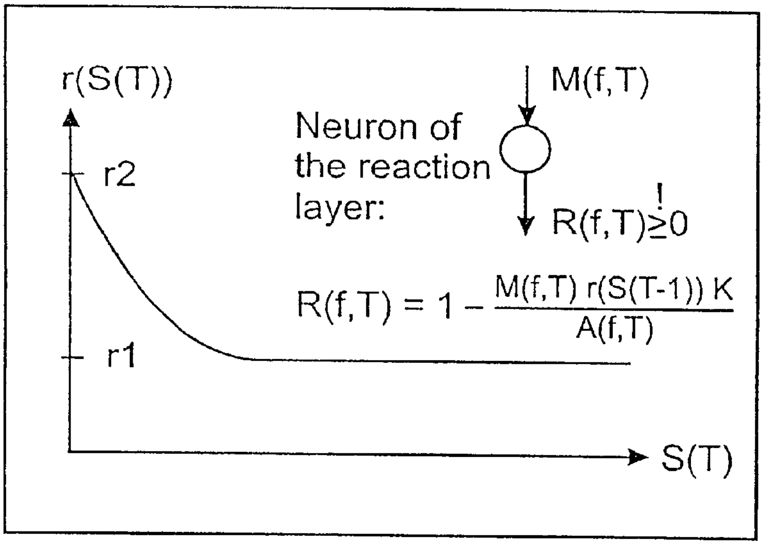
FIG. 4 a neuron of the reaction layer which determines the relative spectrum R(f,T) with the aid of a reaction function r[S(T−1)] from integral signal S(T−1) and a freely selectable parameter K, which sets the magnitude of the noise suppression, and from A(f,T) and M(f,T)
Figure 6:
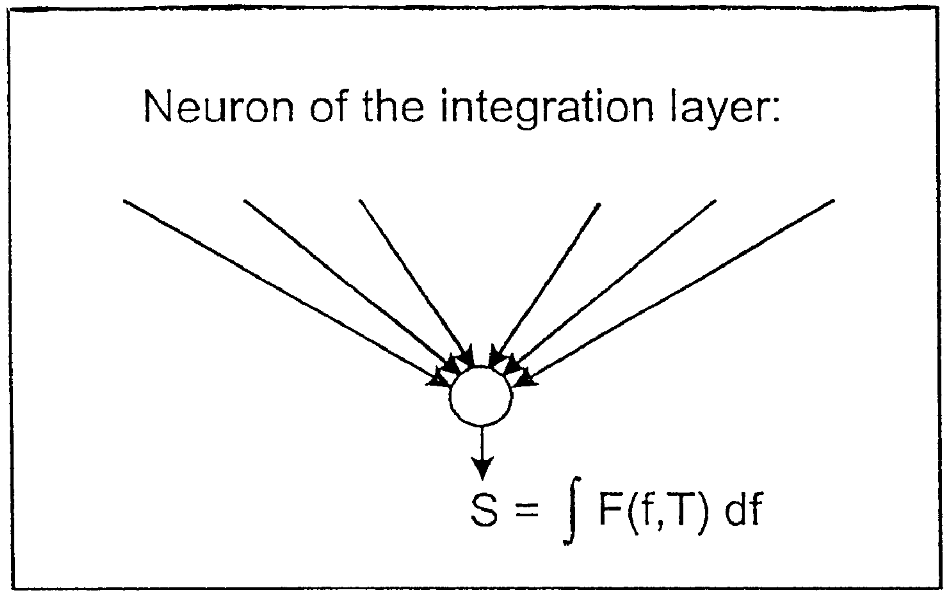
FIG. 6 a neuron of the integration layer illustrated.

FIG. 4 shows a neuron of the reaction layer which uses a reaction function r[S(T−1)] to determine a relative spectrum R(f,T) from integration signal S(T−1)—as shown in detail in FIG. 6—and from a freely selectable parameter which sets the magnitude of noise suppression, as well as from A(f,T) and M(f,T). R(f,T) has a value between zero and one. The reaction layer distinguishes speech from audible noise by evaluating the time response of the signal.

Figure 5:
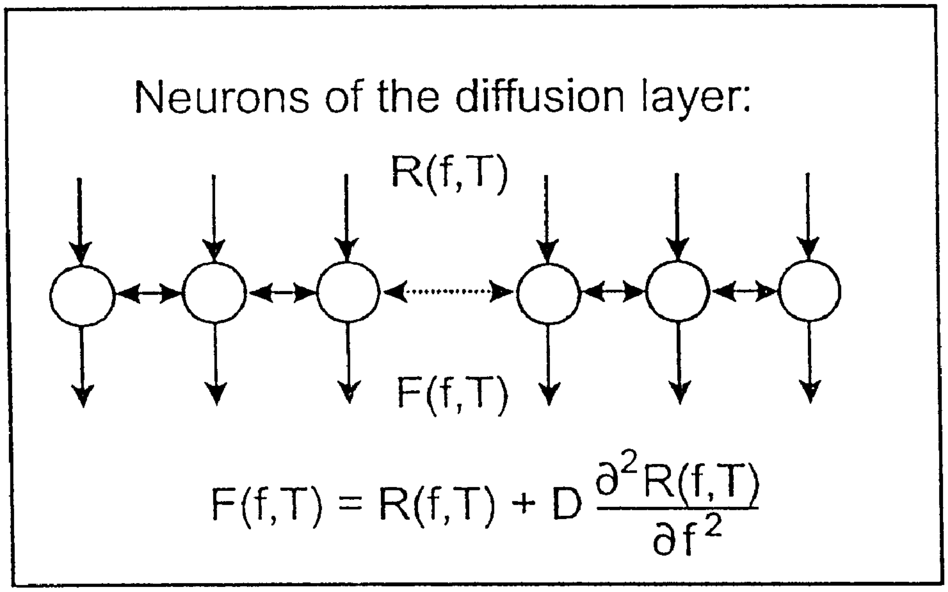
FIG. 5 neurons of the diffusion layer, in which local mode coupling corresponding to the diffusion is effected.

FIG. 5 shows a neuron of the diffusion layer which effects local mode coupling corresponding to the diffusion. Diffusion constant D determines the amount of the resultant smoothing over frequencies f with time T fixed. The diffusion layer derives from relative signal R(f,T) the filtering function F(f,T) proper, with which spectrum A(f,T) is multiplied to eliminate audible noise. The diffusion layer distinguishes speech from audible noise by way of their spectral properties.

FIG. 6 shows the single neuron used in the selected embodiment of the invention to form the integration layer; it integrates filter function F(f,T) over all frequencies f with time T fixed and feeds the integration signal S(T) so obtained back into the reaction layer, as shown in FIG. 2. By virtue of this global coupling the filtering effect is high when the noise level is high while noise-free speech is transmitted without degradation.

Figure 7:
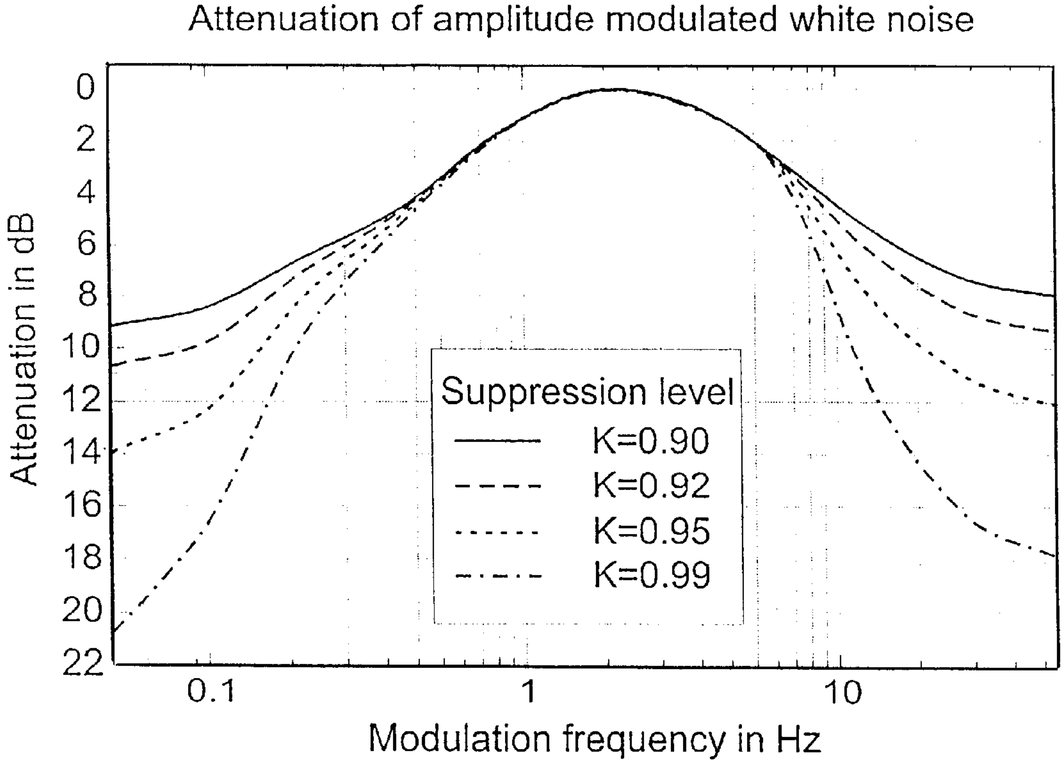
FIG. 7 an example of the filtering properties of the invention responsive to various settings of control parameter K.

FIG. 7 shows exemplary filtering properties of the invention for a variety of control parameter K. The remainder of the parameters of the invention are n=256 samples/frame, m=2.5 frames, 1=15 frames, D=0.25. The Figure shows the attention of amplitude modulated while noise over the modulation frequency. The attenuation is less than 3 dB for modulation frequencies between 0.6 Hz and 6 Hz. This interval corresponds to the typical modulation of human speech.

The invention will now be explained in greater detail under reference to a specific embodiment example. To start with, a speech signal degraded by any type of audible noise is sampled and digitized in a sampling unit 10 as shown in FIG. 1. This way, samples x(t) are generated in time t. Of these, groups of n samples are assembled to form a frame the spectrum A(f,T) of which at time T is computed using Fourier transformation.

The modes of the spectrum differ in their frequencies f. A filter unit 11 is used to generate from spectrum A(f,T) a filter function F(f,T) for multiplication with the spectrum to generate the filtered spectrum B(f,T) from which the noise-free speech signal y(t) is generated by inverse Fourier transformation in a synthesis unit. The noise-free speech signal can then be converted to analog for audible reproduction by a loudspeaker, for example.

Filter function F(f,T) is generated by means of a neural network comprising a minima detection layer, a reaction layer, a diffusion layer and an integration layer, as shown in FIG. 2. Spectrum A(f,T) generated by sampling unit (10) is initially input to the minima detection layer as it is shown in FIG. 3.

Each single neuron of this layer operates independently from the other neurons of the minima detection layer to process a unique mode which is characterized by frequency f. For this mode, the neuron averages the amplitudes A(f,T) in time T over m frames. The neuron then uses these averaged amplitudes to derive for its mode the minimum over an interval in T corresponding to the length of 1 frames. In this manner the neurons of the minima detection layer generate a signal M(f,T), which is then input to the reaction layer.

Each neuron of the reaction layer processes a single mode of frequency f and does so independently from all other neurons in the reaction layer shown in FIG. 4. To this end, each neuron has applied to it an externally settable parameter K the magnitude of which determines the amount of noise suppression of the filter in its entirety. In addition, these neurons have available the integration signal S(T−1) of the preceding frame (time T−1), which was computed in the integration layer shown in FIG. 6.

This signal is the argument of a non-linear reaction function r used by the reaction-layer neurons to compute the relative spectrum R(f,T) at time T.

The range of values of the reaction function is limited to an interval [r1, r2]. The range of values of the resultant relative spectrum R(f,T) so derived is limited to the interval [0, 1].

The reaction layer evaluates the time behaviour of the speech signal in order to distinguish the audible noise from the wanted signal.

Spectral properties of the speech signal are evaluated in the diffusion layer as it is shown in FIG. 5, the neurons of which effect local mode coupling in the way of diffusion in the frequency domain.

In the filter function F(f,T) generated by the diffusion-layer neurons, this results in an assimilation of adjacent modes, with the magnitude of such assimilation determined by diffusion constant D. In so-called dissipative media, mechanisms similar to those acting in the reaction and diffusion layer result in pattern formation which is a matter of research in the field of non-linear physics.

At time T, all modes of filter function F(f,T) are multiplied with the corresponding amplitudes A(f,T), resulting in audible noise-free spectrum B(f,T), which is converted to noise-free speech signal y(t) by inverse Fourier transformation. In the integration layer, integration takes place over the modes of filter function F(f,T) to give integration signal S(T) as shown in FIG. 6.

This integration signal is fed back into the reaction layer. As a result of this global coupling, the magnitude of the signal manipulation in the filter is dependent on the audible-noise level. Low-noise speech signals pass the filter with little or no processing; the filtering effect becomes substantial as the audible-noise level is high. In this, the invention differs from conventional bandpass filters, of which the action on signals depends on the selected fixed parameters.

In contradistinction to classical filters, the subject matter of the invention does not have a frequency response in the conventional sense. In measurements with a tunable sine test signal, the rate of modulation of the test signal itself will affect the properties of the filter.

A suitable method of analysing the properties of the inventive filter uses an amplitude modulated noise signal to determine the filter attenuation as a function of the modulation frequency, as shown in FIG. 7. To this end, the averaged integrated input and output powers are related to each other and the results plotted over the modulation frequency of the test signal. FIG. 7 shows this "modulation response" for different values of control parameter K.

For modulation frequencies between 0.6 Hz and 6 Hz, the attentuation is below 3 dB for all values of control parameter K shown. This interval corresponds to the modulation of human speech, which can pass the filter in an optimum manner for this reason. Signals outside the aforesaid range of modulation frequencies are identified as audible noise and attenuated in dependence on the setting of parameter K.

References

10 Sampling unit which samples, digitizes and divides a speech signal x(t) into frames and uses Fourier transformation to determine spectrum A(f,T) thereof

11 Filter unit for computing from spectrum A(f,T) a filter function F(f,T) and for using it to generate a noise-free spectrum B(f,T)

12 Synthesis unit using filtered spectrum B(f,T) to generate noise-free speech signal y(t)

A(f,T) Signal spectrum, i.e. amplitude of frequency mode f at time T

B(f,T) Spectral amplitude of frequency mode f at time T after the filtering

D Diffusion constant determining the amount of smoothing in the diffusion layer

F(f,T) Filter function generating B(f,T) from A(f,T): B(f, T)=F(f,T)A(f,T) for all f at time T f Frequency which distinguishes the modes of a spectrum K Parameter for setting the amount of noise suppression l Number of frames from which M(f,T) may be obtained as the minimum of the averaged A(f,T)

m Number of frames averaged to determine M(f,T)

n Number of samples per frame

M(f,T) Minimum within I frames of amplitude A(f,T) averaged over m

R(f,T) Relative spectrum generated by the reaction layer r[S(T)] Reaction function of the reaction-layer neurons r1, r2 Limits of the range of values of the reaction function r1<r(S(T))<r2

S(T) Integration signal corresponding to the integral of F(f,T) over f at time T t Time in which the speech signal is sampled T Time in which the time signal is processed to form frames and spectra are derived therefrom.

x(t) Samples of the noisy speech signal y(t) Samples the noise-free speech signal The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of suppressing audible noise during transmission of a speech signal by means of a multi-layer self-organizing feed-back neural network, the method comprising the steps of:

providing a minima detection layer, a reaction layer, and a diffusion layer, and an integration layer, the minima detection layer for tracking a plurality of minima, the reaction layer utilizing a non-linear reaction function, the diffusion layer having only local coupling of neighboring nodes within the diffusion layer, and the integration layer summing a nodal output of the diffusion layer into a single node without weighting; and defining a filter function F(f,T) for noise filtering by successively coupling nodes between the minima detection layer, the reaction layer, the diffusion layer, and the integration layer, wherein f denotes a frequency of a spectral component being analysed at time T.

2. The method as in claim 1, further comprising the step of multiplying an adjustable parameter K with a reaction function in the reaction layer in order to determine an amount of noise suppression of the filter function F(f,T) in its entirety.

3. The method as in claim 1, wherein one node of the integration layer integrates the filter function F(f,T) at a fixed time T over the frequencies f, and wherein a resultant integration signal S(T) so obtained is fed back into the reaction layer.

4. The method as in claim 1, further comprising the step of inputting a spectrum A(f,T) generated by a sampling unit (10) to the minima detection layer, wherein a minima of averaged amplitudes of spectral components A(f,T) averaged over a time corresponding to m frames of an input signal are detected within a given time interval of a length that corresponds to 1 frames of the input signal.

5. The method as in claim 1, further comprising the step of:

using a neural network to generate the filter function F(f,T) from a spectrum A(f,T) being derived by Fourier transformation from a frame of an input signal x(t); spectrum A(f,T), and the filter function F(f,T) being multiplied to generate a noise-reduced spectrum B(f,T) that, by application of an inverse Fourier transformation in a synthesis unit (12), generates a noise reduced speech signal y(t), wherein one node of the minima detection layer operates independently from other nodes of the minima detection layer to process a single signal component of the frequency f, and wherein t denotes the time of handling a sample of the signals x and/or y.

6. The method as in claim 1, further comprising the step of evaluating spectral properties of speech signals in the diffusion layer, the nodes of said diffusion layer effecting frequency component coupling in a manner of diffusion in a frequency domain, with a diffusion constant D>0.

7. The method as in claim 1, further comprising the step of multiplying all frequency components of filter function F(f,T) at time T with corresponding amplitudes A(f,T), wherein the integration layer effects integration over frequency components of the filter function F(f,T) to produce an integration signal S(T) to be fed back into the reaction layer.

8. The method as in claim 1, wherein signal components of the speech speech are modulated within modulation frequencies between 0.6 Hz and 6 Hz, an attenuation is less than 3 dB for all values of control parameter K in order to pass the filter function F(f,T) in an optimum manner, the modulation frequencies between 0.6 Hz and 6 Hz corresponding to modulation of human speech, and wherein the signal components outside of the range of 0.6 Hz to 6 Hz are identified as noise, and are more strongly attenuated based on a value of an adjustable parameter K.

9. An apparatus for audible noise suppression during transmission of a speech signal with a neural network comprising:

a minima detection layer, a reaction layer, a diffusion layer, and an integration layer;

the minima detection layer for tracking a plurality of minima, the reaction layer utilizing a non-linear reaction function, the diffusion layer having only local coupling of neighboring nodes within the diffusion layer, and the integration layer for summing a nodal output of the diffusion layer into a single node without weighting; and a filter function F(f,T) for noise filtering, wherein frequency components of a spectrum differ by frequency f and correspond to unique nodes for each of the layers of the network, except for the integration layer, and wherein each node of the minima detection layer derives a value M(f,T) for the frequency component f at time T, where M(f,T) is obtained by time-averaging an amplitude A(f,T) over a time interval of a length of m frames and a minimum detection of said average within a time interval of the length of 1 frames, with 1>m.

10. The apparatus as in claim 9, wherein each node of the reaction layer which uses a reaction function r[S(T−1)] to determine relative spectrum R(f,T) from integration signal S(T−1), and a freely selectable parameter K, sets an the noise suppression, and from A(f,T) and M(f,T), with relative spectrum R(f,T) having a range of values between zero and one, a formula for determination of R(f,T) being R(f,T)=1−M(f,T)r[S(T−1)]K/A(f,T) with the reaction function r[S(T−1)].

11. The apparatus as in claim 10, wherein a range of values of the reaction function is limited to an interval [r1, r2], by a reaction function reading r(S)=(r2−r1)exp(S)+r1, wherein r1 and r2 are arbitrary numbers, and r1<r2, and wherein the range of values of the resultant relative spectrum R(f,T) is limited to the interval [0, 1] by setting R(f,T)=1 in case R(f,T)>1 and setting R(f,T)=0 in case R(f,T)<0.

12. The apparatus as in claim 10, wherein the nodes of the reaction layer have input thereto an integration signal S(T−1) from a preceding frame (time T−1), and are computed in the integration layer and are fed back into the reaction layer.

13. The apparatus as in claim 9, wherein attenuation of the speech signal for all indicated values of control parameter K is lower than 3 dB when speech signals are modulated within modulation frequencies between 0.6 Hz and 6 Hz.

* * * * *